United States Patent
Noh et al.

(10) Patent No.: US 9,780,396 B2
(45) Date of Patent: Oct. 3, 2017

(54) METHOD OF OPERATING FUEL CELL WITH HIGH POWER AND HIGH POWER FUEL CELL SYSTEM

(71) Applicant: LG CHEM, LTD., Seoul (KR)

(72) Inventors: Tae-Geun Noh, Seoul (KR); Won-Ho Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 489 days.

(21) Appl. No.: 14/334,236

(22) Filed: Jul. 17, 2014

(65) Prior Publication Data

US 2014/0329157 A1    Nov. 6, 2014

Related U.S. Application Data

(62) Division of application No. 12/747,819, filed as application No. PCT/KR2008/007189 on Dec. 5, 2008, now Pat. No. 8,822,089.

(30) Foreign Application Priority Data

Dec. 12, 2007  (KR) .................. 10-2007-0129194

(51) Int. Cl.
*H01M 8/04119* (2016.01)
*H01M 8/04537* (2016.01)
(Continued)

(52) U.S. Cl.
CPC ... *H01M 8/04126* (2013.01); *H01M 8/04089* (2013.01); *H01M 8/04559* (2013.01);
(Continued)

(58) Field of Classification Search
CPC ......... H01M 8/04835; H01M 8/04559; H01M 8/04589; H01M 8/04619; H01M 8/04089;
(Continued)

(56) References Cited

U.S. PATENT DOCUMENTS 6,500,573 B1   12/2002   Simazu et al.
7,051,801 B1    5/2006   Cargnelli et al.
(Continued)

FOREIGN PATENT DOCUMENTS

JP    5-47394 A    2/1993
JP    11-191423 A    7/1999
(Continued)

OTHER PUBLICATIONS

Japanese Patent Office in Application No. 2010-536850 dated Feb. 12, 2012.
(Continued)

*Primary Examiner* — Basia Ridley
*Assistant Examiner* — Heng Chan
(74) *Attorney, Agent, or Firm* — Dentons US LLP (57) ABSTRACT

A fuel cell is operated with high power such that which a humidified gas and a dry gas are selectively supplied as oxidant to a cathode of the fuel cell. This method includes (S1) supplying a humidified gas while a power is constantly maintained or until the power begins to decrease; (S2) after supplying the humidified gas, supplying a dry gas to obtain a greater power than an average power of the step (S1); and (S3) after obtaining a predetermined power in the step (S2), repeatedly supplying a humidified gas in case the power decreases and supplying a dry gas in case the power decreases again afterwards, thereby increasing the power such that the predetermined power is maintained. This method provides an optimal operating condition to a fuel cell, thereby ensuring a high power.

1 Claim, 4 Drawing Sheets

(51) Int. Cl.
  *H01M 8/04089* (2016.01)
  *H01M 8/04828* (2016.01)
  *H01M 8/1004* (2016.01)
  *H01M 8/241* (2016.01)
  *H01M 8/1018* (2016.01)

(52) U.S. Cl.
  CPC ... *H01M 8/04589* (2013.01); *H01M 8/04835* (2013.01); *H01M 8/1004* (2013.01); *H01M 8/241* (2013.01); *H01M 2008/1095* (2013.01); *Y02E 60/50* (2013.01)

(58) Field of Classification Search
  CPC ...... H01M 8/04753; H01M 2008/1095; Y02E 60/50
  See application file for complete search history.

(56) References Cited

U.S. PATENT DOCUMENTS

| | | |
|---|---|---|
| 7,172,826 B2 | 2/2007 | Nomoto |
| 2006/0029837 A1 | 2/2006 | Sennoun et al. |

FOREIGN PATENT DOCUMENTS

| | | | |
|---|---|---|---|
| JP | 2000-82480 A | | 3/2000 |
| JP | 2000-082481 A | | 3/2000 |
| JP | 2005-047394 A | | 2/2005 |
| JP | 2005-294223 A | | 10/2005 |
| JP | 2005294223 A | * | 10/2005 |
| JP | 2011-191423 A | | 9/2011 |
| KR | 102005-0022349 A | | 3/2005 |

OTHER PUBLICATIONS

Office Action of European Patent Office in Application No. 08 859 812.3 dated Oct. 31, 2013.
Office Action of Chinese Patent Office in Application No. 200880120618.4 dated Dec. 13, 2013.

* cited by examiner

METHOD OF OPERATING FUEL CELL WITH HIGH POWER AND HIGH POWER FUEL CELL SYSTEM

This application is a divisional application of U.S. patent application Ser. No. 12/747,819 filed Sep. 10, 2010, which is a 35 U.S.C. §371 National Stage entry of International Application No. PCT/KR2008/007189 filed on Dec. 5, 2008 and claims priority to Korean Korean Patent Application No. 10-2007-0129194 filed on Dec. 12, 2007, all of which are incorporated herein by reference.

TECHNICAL FIELD

The present invention relates to a method of operating a fuel cell with high power and a high power fuel cell system. More particularly, the present invention relates to a method of operating a fuel cell with high power and a high power fuel cell system, which prevents flooding and maintains an amount of moisture in an electrode to an optimal state.

BACKGROUND ART

Recently, as depletion of conventional energy resources such as oil or coal is foreseen, interest in alternative energies is increasing. A fuel cell is one of the alternative energies, and advantageously has a high efficiency, does not emit pollutants such as $NO_x$ and $SO_x$ and uses a fuel that is abundant in quantity, and therefore, the fuel cell attracts public attention.

The fuel cell is a power generation system that converts chemical reaction energy of a fuel and an oxidant to electrical energy, and typically hydrogen and hydrocarbon, for example methanol or butane, are used as a fuel, and oxygen is representatively used as an oxidant.

Figure 1:
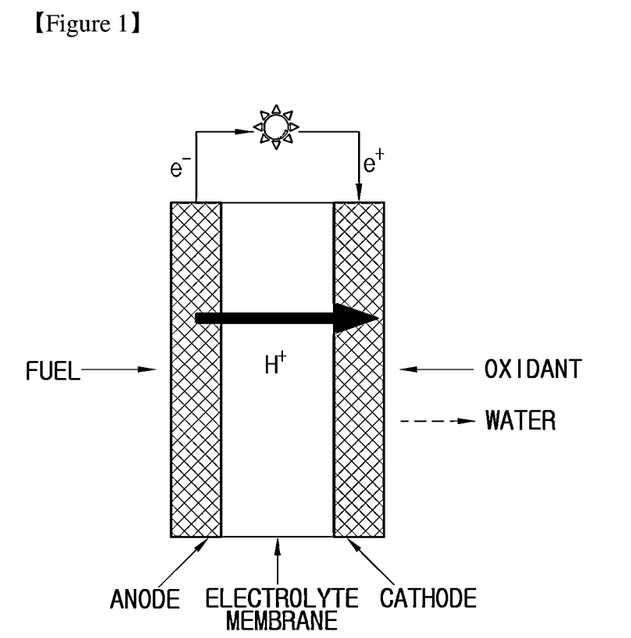
FIG. 1 is a schematic view illustrating the principle for generating electricity of a fuel cell.

In the fuel cell, a membrane electrode assembly (MEA) is the basic unit for generating electricity, and includes an electrolyte membrane and anode and cathode electrodes formed at opposite sides of the electrolyte membrane. FIG. 1 illustrates the principle for generating electricity of a fuel cell, and Chemical FIG. 1 represents a reaction formula of a fuel cell in the case that hydrogen is used as a fuel. Referring to FIG. 1 and Chemistry figure 1, an oxidation reaction of a fuel occurs at an anode electrode to generate hydrogen ions and electrons, and the hydrogen ions move to a cathode electrode through an electrolyte membrane. The hydrogen ions transmitted through the electrolyte membrane and the electrons react with oxygen (oxidant) at the cathode electrode to generate water. This reaction causes the electrons to move to an external circuit.

Anode electrode: $H_2 \rightarrow 2H^+ + 2e^-$ cathode electrode: $\frac{1}{2}O_2 + 2H^+ + 2e^- \rightarrow H_2O$ Reaction formula: $H_2 + \frac{1}{2}O_2 \rightarrow H_2O$     Chemistry Figure 1

Figure 2:
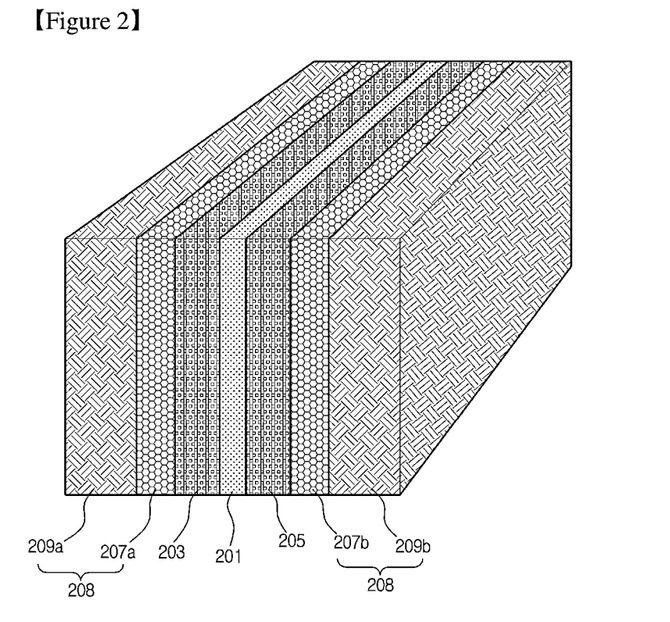
FIG. 2 is a schematic view illustrating a general configuration of a membrane electrode assembly for a fuel cell.

FIG. 2 illustrates a general configuration of a membrane electrode assembly for a fuel cell. Referring to FIG. 2, a membrane electrode assembly for a fuel cell includes an electrolyte membrane 201, and an anode electrode and a cathode electrode located at opposite sides of the electrolyte membrane 201. The anode and cathode electrodes respectively include catalyst layers 203, 205 and a gas diffusion layer 208. The gas diffusion layer includes electrode substrates 209a, 209b and microporous layers 207a, 207b formed on the electrode substrates.

Studies for a fuel cell exhibiting a high power required to enhance compatibility of a fuel cell with many advantages as mentioned above become more active, and particularly the demands on fuel cells capable of continuously providing high power are more increased.

A fuel cell generates electricity by moving hydrogen ions as mentioned above. Here, what is helpful for moving such hydrogen ions is moisture, which is also a resultant of reaction in the electrode. However, the amount of moisture generated as a result of reaction is not so sufficient to fully ensure ion conductivity of a fuel cell, so a fuel cell is generally operated under a humidity condition.

However, if there exists an excessive amount of moisture, flooding occurs, which may block fine holes in a catalyst layer or a gas diffusion layer, decrease a three-phase reaction point, and decrease the efficiency of a fuel cell resultantly.

As mentioned above, the amount of moisture in an electrode of a fuel cell is a factor dominating the performance of the electrode. Thus, in order to obtain a high power from a fuel cell, moisture introduced into an electrode or generated from the electrode should be suitably controlled.

However, such control is very troublesome, and no effective solution has been suggested up to now. Thus, it is urgent to develop a technique capable of maintaining a suitable amount of moisture in an electrode of a fuel cell to obtain a high power.

DISCLOSURE

Technical Problem

Therefore, an object of the present invention is to provide a method of operating a fuel cell and a fuel cell system, which may enhance a power of the fuel cell by controlling the flooding phenomenon without supplying additional fuel or oxidant.

Technical Solution

In order to accomplish the above object, the present invention provides a method of operating a fuel cell with high power, in which a humidified gas and a dry gas are selectively supplied as oxidant to a cathode of the fuel cell, the method including: (S1) supplying a humidified gas while a power is constantly maintained or until the power begins to decrease; (S2) after supplying the humidified gas, supplying a dry gas to obtain a greater power than an average power of the step (S1); and (S3) after obtaining a predetermined power in the step (S2), repeatedly supplying a humidified gas in case the power decreases and supplying a dry gas in case the power decreases again afterwards, thereby increasing the power such that the predetermined power is maintained.

Inventors found that the power of a fuel cell is greatly improved when a dry gas is supplied while a humidified gas is supplied for a certain time. The inventors also found that the improved power is maintained when a humidified gas and a dry gas are alternately supplied afterwards. Thus, the method of operating a fuel cell according to the present invention enables to give a high power from a fuel cell.

In the above method, the fuel cell is preferably operated with current density of 500 mA/cm² or above. Also, in the steps (S1) and (S3), the humidified gas is preferably supplied for 20 seconds or less, and, in the steps (S2) and (S3), the dry gas is preferably supplied for 250 seconds or less. However, the present invention is not limited to the above.

In another aspect of the present invention, there is also provided a high power fuel cell system in which a humidified gas and a dry gas are selectively supplied as oxidant to a cathode of a fuel cell, the system including: a stack including a single membrane electrode assembly or including at least two membrane electrode assemblies and a separator interposed between the membrane electrode assemblies; a detector connected to both ends of the stack to measure current or voltage at both ends of the stack; a controller connected to the detector, the controller generating a humidified gas supply signal when the fuel cell starts operation, then receiving a measured current or voltage value from the detector to generate a dry gas supply signal to increase a power in case the power is constantly maintained or decreased after the humidified gas is initially supplied, and then alternately generating a humidified gas supply signal and a dry gas supply signal to maintain the increased or predetermined power; and an oxidant supplier for receiving a signal of the controller and selectively supplying a dry gas or a humidified gas according to the signal.

BEST MODE

Hereinafter, an electrode for a fuel cell of the present invention will be described in detail according to its preparing method. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Figure 3:
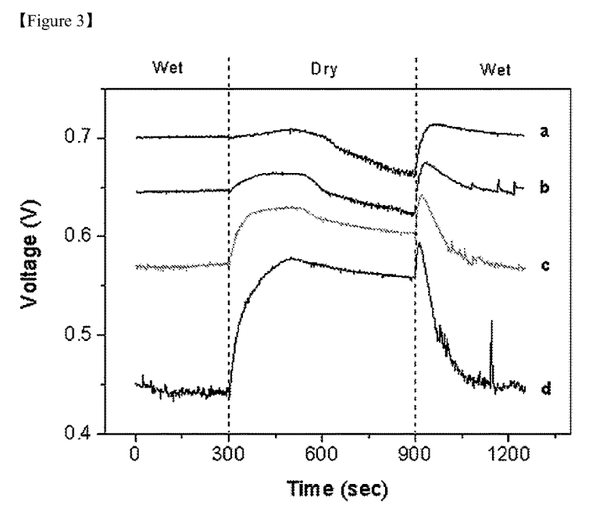
FIG. 3 is a graph illustrating output voltages, measured at certain current densities (a: 300 mA/cm$^2$, b: 500 mA/cm$^2$, c: 700 mA/cm$^2$, d: 900 mA/cm$^2$) after subsequently supplying a humidified gas, a dry gas and a humidified gas to a cathode while a fuel cell is in operation.

As mentioned above, inventors found that the power of a fuel cell is greatly improved when a dry gas is supplied to a cathode of the fuel cell while a humidified gas is supplied as oxidant to the cathode during a predetermined time. In this regards, FIG. 3 shows a graph exhibiting a voltage measured while supplying a humidified gas with a relative humidity of about 100% to a cathode of a fuel cell for a certain time, then supplying a dry gas with a relative humidity of about 0%, and then supplying a humidified gas again (a: 300 mA/cm$^2$, b: 500 mA/cm$^2$, c: 700 mA/cm$^2$, d: 900 mA/cm$^2$). Here, it would be understood that the power of a fuel cell is increased in case a dry gas is supplied after a humidified gas is initially supplied. The present invention discloses a high power fuel cell system and its operating method, which may maintain a high power of a fuel cell on the above perception.

Hereinafter, a method of operating a fuel cell according to the present invention is explained in detail.

The method of operating a fuel cell according to the present invention is used for operating a high power fuel cell in which a humidified gas or a dry gas is selectively supplied as oxidant to a cathode of the fuel cell. Here, a humidified gas is firstly supplied to the cathode while a power is maintained or until a power begins to decrease (S1).

As shown in FIG. 3, while a humidified gas is initially supplied, the power of the fuel cell is not greatly changed. However, as time goes, the power is maintained to a certain level or decreases slightly.

The humidified gas and the dry gas may adopt any oxidant used in the art. For example, the humidified gas and the dry gas may be air or oxygen, but not limitedly.

The humidity of the humidified gas may be selected without any limitation if moisture may be supplied over a minimal level. For example, the humidified gas may have a relative humidity of 70% or above, but not limitedly. As the relative humidity of the humidified gas is greater, the humidifying effect aimed in the present invention may be more excellent. For example, the relative humidity of the humidified gas may be 99.9999%, but not limitedly.

Then, after the humidified gas is supplied, a dry gas is supplied to the cathode so as to obtain a greater power than an average power of the step S1 (S2).

As shown in FIG. 3, when a dry gas is supplied to the cathode after the humidified gas is initially supplied, the power of the fuel cell is increased. In particular, it would be understood that the power is greatly increased, as current density is greater. It is considered that, as the dry gas is supplied, the flooding phenomenon in the electrode is solved, and moisture is evaporated at a three-phase reaction point such that $O_2$ may more easily reaches the three-phase reaction point, thereby increasing the power of a fuel cell.

The humidity of the dry gas may be selected without any limitation if the flooding of an electrode may be solved. For example, the dry gas may have a relative humidity of 20% or less, but not limitedly. As the relative humidity of the dry gas is smaller, the drying effect aimed by the present invention may be more excellent. For example, the relative humidity of the dry gas may be 0.0001% at the minimum, but not limitedly.

Subsequently, after a predetermined power is obtained in the step S2, when the power decreases, a humidified gas is supplied to the cathode to maintain the predetermined power. After that, when the power decreases again, a dry gas is supplied to increase the power such that the predetermined power may be maintained (S3). The above process is repeatedly executed.

As shown in FIG. 3, when the time for supplying a dry gas passes, it would be understood that the power reaches a peak, is kept at the peak for a while, and then decreases again.

In a region where the power increases and is kept at a certain value while a dry gas is introduced to the cathode, the flooding phenomenon is solved and moisture at the three-phase reaction point is evaporated to contribute to the increase of power. However, moisture in an ionomer is evaporated together, which seems to decrease the power. As a result, there is found a region where the entire power of the fuel cell is constant.

After that, if the dry gas is supplied continuously, the flooding phenomenon is entirely eliminated, and moisture in the ionomer is excessively evaporated, which prohibits transfer of proton through the ionomer, so the power starts being deteriorated.

Thus, as shown in FIG. 3, if a humidified gas is supplied secondarily, the shortage of moisture is solved, thereby increasing the power. However, if the humidified gas is supplied continuously, moisture is excessively supplied, so the power of the fuel cell starts being deteriorated.

Thus, the method of operating a fuel cell according to the present invention includes the step of controlling an amount of moisture by supplying a dry gas again to the cathode if the power decreases after the secondary humidified gas is supplied. The above procedure is circulated to supply a humidified gas and a dry gas alternately, thereby providing a high power. In this way, a power higher than an average power of the step (S1), namely an initial power, may be maintained.

Therefore, the point of alternating between a humidified gas and a dry gas may be a point when the power of a fuel cell is deteriorated lower than a demanded high power.

While operating a fuel cell, any person having ordinary skill in the art would easily find such an alternating point for supplying a humidified gas or a dry gas. For example, a humidified gas may be supplied for 20 seconds or less from the point that the humidified gas starts being supplied, but not limitedly. If a humidified gas is supplied over 20 seconds, flooding may occur. Also, a dry gas may be supplied for 250 seconds or less from the point that the dry gas starts being supplied. If the dry gas is supplied over 250 seconds, moisture may be insufficient in an electrode membrane. The time period for supplying a humidified gas or a dry gas has no special restriction in its lowest limit, since it would be sufficient if flooding does not occur or the electrode membrane is not dried in earnest. For example, a humidified gas may be supplied for 1 to 20 seconds, and a dry gas may be supplied for 1 to 250 seconds, for example, but not limitedly.

Figure 4:
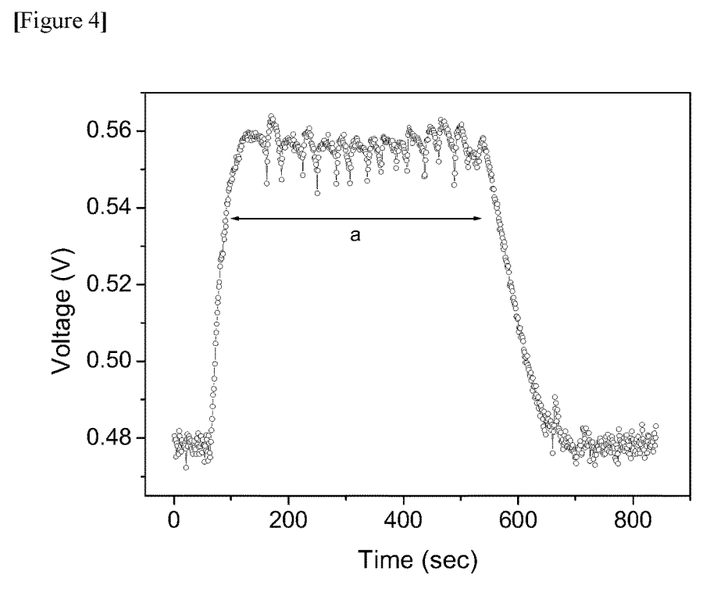
FIG. 4 is a graph illustrating measurement results of output voltages according to an example 1 of the present invention.
Figure 6:
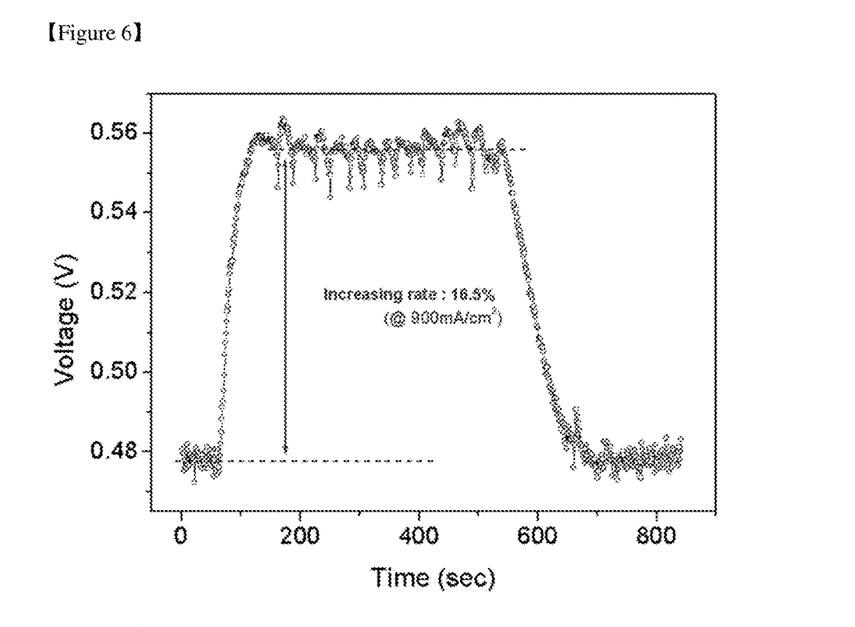
FIG. 6 is a graph illustrating measurement results of output voltages and increases of the output voltages according to an example 1 of the present invention.
Figure 7:
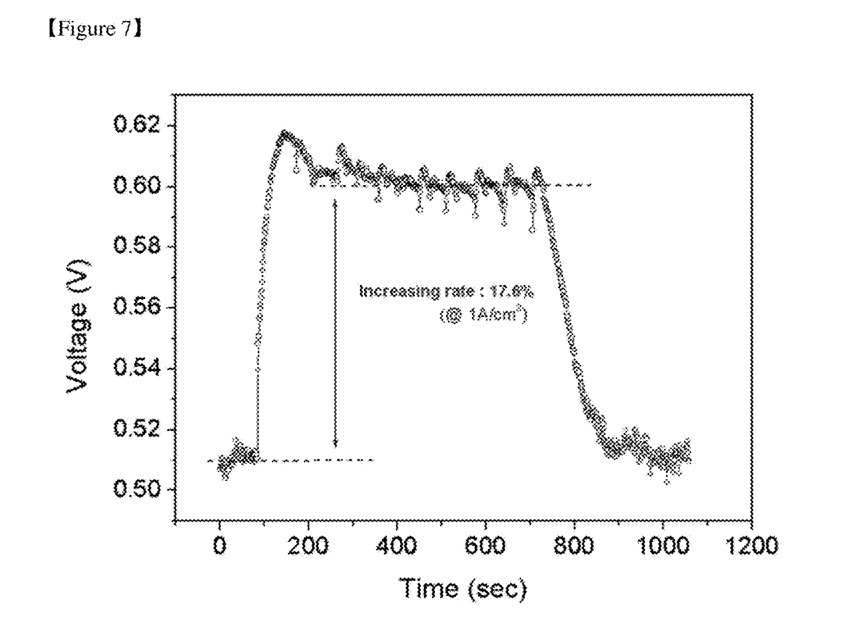
FIG. 7 is a graph illustrating measurement results of output voltages and increases of the output voltages according to an example 2 of the present invention.

FIGS. 4, 6 and 7 are graphs showing output voltages at certain current density, measured while initially supplying a humidified gas, then supplying a dry gas to increase a power, and then alternately supplying a humidified gas and a dry gas again. In FIG. 4, it is well illustrated that an output voltage is constant in an initial humidified gas supply region, then the output voltage is greatly increased in a region where the dry gas is supplied, and then the increased output voltage is maintained in a region (a) where humidified and dry gases are alternately supplied.

Also, referring to FIGS. 6 and 7, in a region where humidified and dry gases are alternately supplied after a high power is obtained (corresponding to the region (a) in FIG. 4), namely in a high power region, it would be found that the power is repeatedly increased and decreased based on an average power. As mentioned above, such increase and decrease of power in the high power region result from repeated alternate supply of humidified and dry gases. Average power value and highest and lowest power values in the high power region may be variously and suitably selected according to the field to which a fuel cell is applied, so they are not specially limited. For example, as for output values in the high power region, the lowest power value may be 90% of an average power in the high power region, and the highest power value may be 110% of the average power in the high power region, but not limitedly.

In addition, in the operating method of the present invention, as current density is greater, the power is more increased. Thus, a high power may be more effectively obtained when a fuel cell is operated with current density of 500 mA/cm$^2$ or above. Various current densities are demanded according to the fields to which a fuel cell is applied, so an upper limit of the current density is not specially restricted. For example, a fuel cell may be operated with current density of about 1,000 mA/cm$^2$, and when being applied to a vehicle, a fuel cell may also be operated with current density of 1,200 mA/cm$^2$ to 1,400 mA/cm$^2$.

Hereinafter, a high power fuel cell system is explained in detail with reference to the accompanying drawings as one embodiment operated to the method of the present invention. However, the embodiment described here and illustrated in the drawings is just one preferred example of the present invention and does not represent all spirit of the present invention, so it would be understood that there might be various equivalents and modifications that may be substituted for the present invention.

A high power fuel cell system according to one embodiment of the present invention is configured such that a humidified gas or a dry gas is selectively supplied as oxidant to a cathode of a fuel cell. The high power fuel cell system includes a stack including a single membrane electrode assembly or including at least two membrane electrode assemblies and a separator interposed between the membrane electrode assemblies; a detector connected to both ends of the stack to measure current or voltage at both ends of the stack; a controller connected to the detector to generate a humidified gas supply signal when the fuel cell starts operation, then receiving a measured current or voltage value from the detector to generate a dry gas supply signal to increase a power in case the power is constantly maintained or decreased after the humidified gas is initially supplied, and then alternately generating a humidified gas supply signal or a dry gas supply signal to maintain the increased or predetermined power; and an oxidant supplier for receiving a signal of the controller and selectively supplying a dry gas or a humidified gas according to the signal.

Figure 5:
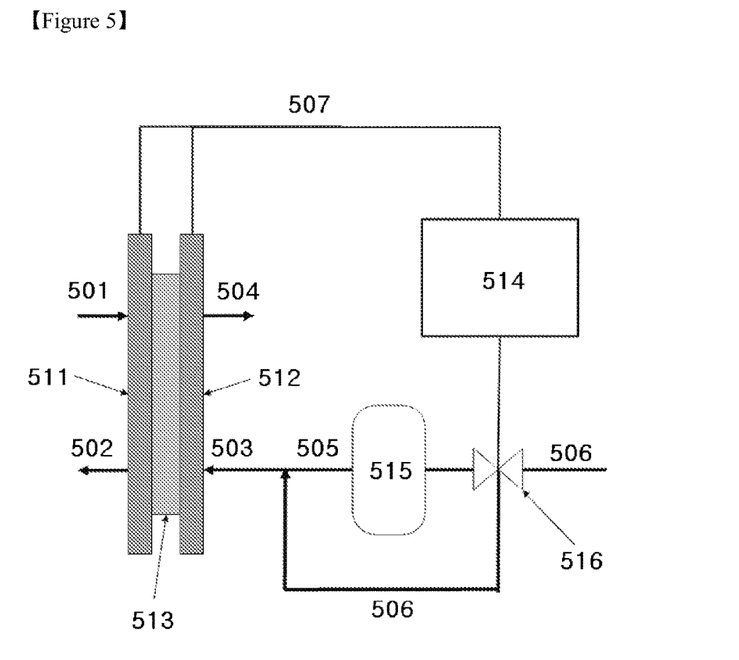
FIG. 5 is a schematic view illustrating one example of a high power fuel cell system according to the present invention.

FIG. 5 is a schematic view showing a high power fuel cell system according to one embodiment of the present invention. Referring to FIG. 5, the high power fuel cell system of this embodiment includes a membrane electrode assembly having an anode 511, a cathode 512 and an electrolyte membrane 513; gas ports of the fuel cell having an anode inlet 501, an anode outlet 502, a cathode inlet 503 and a cathode outlet 504; a detector having output current and voltage measurement lines 507; a controller 514; and an oxidant supplier having a dry gas line 506, a valve 516, a humidifier 515 and a humidified gas line 505.

The membrane electrode assembly employed in the present invention may use any membrane electrode assembly commonly used in the art, as shown in FIG. 2. The membrane electrode assembly for the fuel cell according to the present invention includes an electrolyte membrane 201; and an anode and a cathode located at opposite sides of the electrolyte membrane 201. The anode and cathode may include a gas diffusion layer 208 and catalyst layers 203 and 205, respectively. The gas diffusion layer 208 for the fuel cell according to the present invention may include substrates 209a and 209b and microporous layers 207a and 207b formed on one side of the substrates 209a and 209b, respectively.

The electrolyte membrane of the present invention separates both electrodes and becomes a passage of proton and moisture. The electrolyte membrane employed in the present invention may adopt any electrolyte membrane used in the art, for example any one polymer selected from the group consisting of perfluorosulfonic acid polymer, hydrocarbon-based polymer, polyimide, polyvinylidene fluoride, polyethersulfone, polyphenylene sulfide, polyphenylene oxide, polyphosphazene, polyethylene naphthalate, polyester, doped polybenzimidazol, polyether ketone, polysulfone, or their acids and bases, but the present invention is not limited thereto.

The catalyst layer of the present invention gives a place for oxidation reaction and reduction reaction. The catalyst layer exists on the anode and the cathode, respectively, and it includes a catalyst and a polymer ionomer.

The catalyst may employ any catalyst used in the art without limitation. For example, the catalyst may be a metal catalyst or a metal catalyst on a carbon-based support. The metal catalyst may use representatively platinum, ruthenium, osmium, platinum-ruthenium alloy, platinum-osmium alloy, platinum-palladium alloy, platinum-molybdenum alloy, platinum-rhodium alloy and platinum-transition metal alloy, or their mixtures, but not limitedly.

The carbon-based support may be a carbon-based material, preferably any one of graphite, carbon black, acetylene black, denka black, ketjen black, activated carbon, mesoporous carbon, carbon nanotube, carbon nano fiber, carbon nano horn, carbon nano ring, carbon nano wire, fullerene (C60) and Super-P, or their mixtures.

The polymer ionomer employ any one commonly used in the art, for example representatively a nafion ionomer or a sulfonated polymer such as sulfonated polytrifluorostyrene, but not limitedly.

The gas diffusion layer of the present invention plays a role of current conductive material between the separator and the catalyst layer and it becomes a passage of gas that is a reactant and water that is a product. Thus, the gas diffusion layer has a porous structure (with a porosity of 20 to 90%) such that gas may easily pass through it.

The gas diffusion layer may adopt any gas diffusion layer used in the art, and it may include a conductive substrate selected from the group consisting of carbon paper, carbon cloth and carbon felt. The gas diffusion layer may further include a microporous layer formed on one side of the conductive substrate, and the microporous layer may be made of a carbon-based material or a fluorine-based resin.

The carbon-based material may be any one selected from the group consisting of graphite, carbon black, acetylene black, denka black, ketjen black, activated carbon, mesoporous carbon, carbon nanotube, carbon nano fiber, carbon nano horn, carbon nano ring, carbon nano wire, fullerene (C60) and Super-P, or their mixtures, but the present invention is not limited thereto.

The fluorine-based resin may be any one selected from the group consisting of polytetrafluoroethylene, polyvinylidene fluoride (PVdF), polyvinyl alcohol, cellulose acetate, polyvinylidene fluoride-hexafluoropropylene (PVdF-HFP) copolymer and styrene-butadiene rubber (SBR), or their mixtures, but the present invention is not limited thereto.

The gas diffusion layer may have a suitable thickness as necessary, for example 100 to 400 µm, but not limitedly. If the gas diffusion layer has too small thickness, an electric contact resistance between the catalyst layer and the separator is increased, and the gas diffusion layer may not have so sufficient force to ensure compression. If the thickness is too great, the reactant, gas, may not easily move. Thus, the thickness of the gas diffusion layer should be maintained in a suitable level.

At this time, the catalyst layer is formed between the electrolyte membrane and the microporous layer of the gas diffusion layer.

The separator plays a role of preventing membrane electrode assemblies from being electrically connected to each other and transferring fuel and oxidant supplied from the outside to the membrane electrode assemblies. The separator may adopt any one commonly used in the art. For example, graphite and stainless steel are representative, but not limited thereto.

The fuel introduced into the anode inlet 501 may use hydrogen or hydrocarbon fuel in a gaseous or liquid state, and the hydrocarbon fuel may be methanol, ethanol, propanol, butanol or natural gas.

The oxidant introduced to the cathode inlet 503 may representatively use oxygen or air, and the oxidant is introduced through the humidified gas line 505 or the dry gas line 506.

In the fuel cell system of the present invention, the detector 507 is connected to both ends of the stack to measure current and voltage while the fuel cell is operated. There are various devices electrically connected to both ends of a fuel cell to measure current and voltage, and they may be used as a detector without any limitation.

In the fuel cell system of the present invention, the controller 514 compares a predetermined power or a maximum power set by the initial supply of dry gas with a power transmitted from the detector 507 to determine whether to supply a humidified gas or a dry gas, and then transmits a signal to the oxidant supplier.

In detail, when the fuel cell is in operation, the controller transmits a humidified gas supply signal to the oxidant supplier at an initial stage while a power is maintained constantly or until a power begins to decrease. Then, the controller transmits a dry gas supply signal to the oxidant supplier to increase the power. At this time, the dry gas supply signal is continuously transmitted while the power is increased or maintained in the increased state or until the power begins to decrease below a predetermined value with reference to the power transmitted from the detector 507.

Subsequently, if the power transmitted from the detector 507 is decreased below the increased power or a predetermined power, the controller transmits a humidified gas supply signal again. The controller keeps checking the power transmitted from the detector 507, and then if the power is decreased below the increased power or a predetermined power again after the humidified gas supply signal is transmitted, the controller transmits a dry gas supply signal. After that, the controller alternately transmits humidified gas supply signals and dry gas supply signals to the oxidant supplier as mentioned above such that the power transmitted from the detector 507 is not decreased below the increased power or the predetermined power.

In other words, the controller 514 determines a power greater than an average power transmitted from the detector 507 while the initial humidified gas is supplied as a lowest limit, and then sends humidified gas supply signals and dry gas supply signals to the oxidant supplier such that a power is not decreased below the predetermined power.

The controller 514 may be implemented in various ways well known in the art. For example, the controller may be a program executing the above procedure, an electric circuit or a microprocessor performing such a program, or the like, but not limitedly.

In the fuel cell system of the present invention, the oxidant supplier receives signals from the controller 514 to supply humidified gas or dry gas to the cathode electrode as an oxidant. Humidified gas and dry gas may be selectively supplied in various ways commonly used in the art without any special limitation.

For example, as shown in FIG. 5, the oxidant supplier employed in the present invention may include the dry gas line 506 connected to the cathode inlet 503 of a fuel cell; a three-directional valve 516 provided on the dry gas line; and a humidified gas line 505 diverged from the three-directional valve and connected to an oxidant input portion of the fuel cell and having the humidifier 515 thereon, but not limitedly. Here, the oxidant supplier switches the three-direction valve to alternately supply humidified gas and dry gas according to signals from the controller 514. In detail, if a dry gas supply signal is received from the controller 514, the three-directional valve closes the humidified gas line and opens the dry gas line to supply the dy gas line. On the contrary, if a humidified gas supply signal is received, the three-directional valve closes the dry gas line and opens the humidified gas line to supply the humidified gas.

Humidity of the humidified gas supplied from the oxidant supplier may be selected without any limitation if an amount of supplied moisture is not less than a minimal level necessary to an electrode. For example, a relative humidity of the humidified gas may be 70% or above, but not limitedly. As the relative humidity of the humidified gas is greater, a humidifying effect aimed by the present invention may be more excellent. For example, the relative humidity of the humidified gas may be 99.9999%, but not limitedly.

Humidity of the dry gas supplied from the oxidant supplier may be selected without any limitation if flooding of an electrode may be solved. For example, a relative humidity of the dry gas may be 20% or less, but not limitedly. As the relative humidity of the dry gas is smaller, a drying effect aimed by the present invention may be more excellent. For example, the relative humidity of the dry gas may be 0.0001% as a minimal value, but not limitedly.

Kinds and locations of the dry gas line, the humidified gas line, the valve and the humidifier shown in FIG. 5 are just one example of the present invention, and it should be understood that their locations and configurations may be changed in various ways.

Mode for Invention

Hereinafter, the present invention is explained in more detail using embodiments. However, the following embodiments may be modified in various ways, and the present invention should not be interpreted as being limited thereto. The following embodiments are just given for persons having ordinary skill in the art to understand the present invention in a better way.

Embodiment 1

Catalyst layers using platinum catalysts were formed on both surfaces of an electrolyte membrane (Nafion 112, Dupont), and a gas diffusion layer made of graphite fiber was adhered thereto to make a unit cell.

The unit cell prepared as above was operated at a cell temperature of 70° C. under a hydrogen/air condition, during which a voltage change at 900 mA/cm$^2$ was measured. At this time, gas stoichiometries were 1.3 (anode gas) and 2.0 (cathode gas).

From starting the operation till 63 seconds, a humidified gas with a relative humidity of 100% (±0.5) was supplied to a cathode, and after that, a dry gas with a relative humidity of 0% (±0.5) was supplied to the cathode till 132 seconds. After the supply of dry gas till 528 seconds, humidified gas and dry gas were alternately supplied whenever an output voltage decreases while increasing, thereby maintaining the power. After 528 seconds, only humidified gas was supplied, and then the operation was stopped at 850 seconds.

While the fuel cell is operated, the change of output voltage was observed. The results are shown in FIG. 6.

Embodiment 2

The change of voltage at 1 A/cm$^2$ was measured. From starting the operation of a fuel cell till 83 seconds, a humidified gas was supplied to a cathode, and after that, a dry gas was supplied till 209 seconds. After that till 705 seconds, humidified gas and dry gas were alternately supplied whenever an output voltage decreases while increasing. After 705 seconds, only humidified gas was supplied, and then the operation was stopped at 1060 seconds.

While the fuel cell is operated, the change of output voltage was observed. The results are shown in FIG. 7.

Referring to FIGS. 6 and 7, the fuel cell system of the present invention may continuously maintain a high power, differently from the case that a gas with a constant humidity is supplied to a cathode electrode as shown in FIG. 3. In addition, it would be found that an average power was increased by about 16.5% and 17.6%, respectively, while an increased power is maintained after a dry gas is supplied, in comparison to an average power when a humidified gas is initially supplied.

INDUSTRIAL APPLICABILITY

In the method of operating a fuel cell according to the present invention, it is possible to obtain a great power in an effective way even in a state that a great power is demanded temporarily. In addition, the method of the present invention allows to operate a fuel cell with greater power than a conventional fuel cell even using the same amount of fuel or oxidant.

Also, the fuel cell system of the present invention may give a greater power than a conventional fuel cell. The fuel cell operating method and the fuel cell system disclosed above may be applied to all kinds of industrial fields where fuel cells are used, particularly suitably for vehicles and home heating equipment, which demand great power.

The invention claimed is:

1. A high power fuel cell system in which a humidified gas and a dry gas are selectively supplied as oxidant to a cathode of a fuel cell, the system comprising:
   a stack including a single membrane electrode assembly or including at least two membrane electrode assemblies and a separator interposed between the membrane electrode assemblies;
   a detector connected to both ends of the stack to measure current or voltage at both ends of the stack;
   a controller connected to the detector, the controller programmed to perform the following functions: generating a humidified gas supply signal when the fuel cell starts operation, then receiving a measured current or voltage value from the detector to generate a dry gas supply signal to increase a power in case the power is constantly maintained or decreased after the humidified gas is initially supplied, and then alternately generating the humidified gas supply signal and the dry gas supply signal to maintain an average power that is greater than an average power while the humidified gas is initially supplied as oxidant; and an oxidant supplier for receiving the signal of the controller and selectively supplying the dry gas or the humidified gas to the high power fuel cell according to the signal, wherein only the humidified gas is supplied to the high power fuel cell for 20 seconds or less, wherein only the dry gas is supplied to the high power fuel cell for 250 seconds or less, and wherein a power while the dry gas and the humidified gas are alternately supplied varies from 90% to 110% of the average power while the dry gas and the humidified gas are alternately supplied, wherein the fuel cell is operated with a current density of 500 $mA/cm^2$ or above, wherein the humidified gas has a relative humidity of 70% or above, and wherein the dry gas has a relative humidity of 20% or below.

* * * * *